No. 625,702.　　　　　　　　　　　　　　　　Patented May 23, 1899.
G. E. SAVAGE.
CHAFING DISH.
(Application filed Jan. 12, 1899.)

(No Model.)

Witnesses.　　　　　　　　　　　　　George E. Savage
J. H. Shumway　　　　　　　　　　　　　Inventor
Lillian D. Keley　　　　　　　　By atty Earle Seymour

UNITED STATES PATENT OFFICE.

GEORGE E. SAVAGE, OF MERIDEN, CONNECTICUT, ASSIGNOR TO THE MANNING BOWMAN & COMPANY, OF SAME PLACE.

CHAFING-DISH.

SPECIFICATION forming part of Letters Patent No. 625,702, dated May 23, 1899.

Application filed January 12, 1899. Serial No. 701,925. (No model.)

*To all whom it may concern:*

Be it known that I, GEORGE E. SAVAGE, of Meriden, in the county of New Haven and State of Connecticut, have invented a new Improvement in Chafing-Dishes; and I do hereby declare the following, when taken in connection with the accompanying drawings and the letters of reference marked thereon, to be a full, clear, and exact description of the same, and which said drawings constitute part of this specification, and represent, in—

Figure 1:
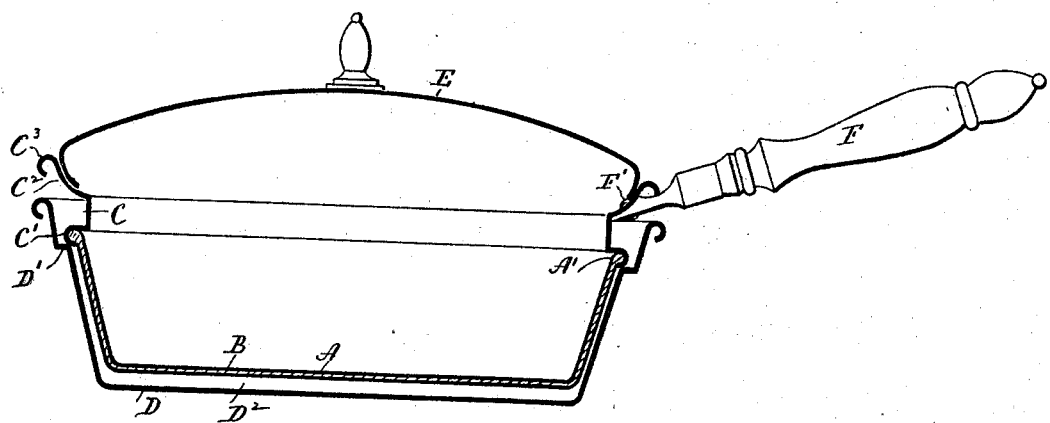
Figure 2:
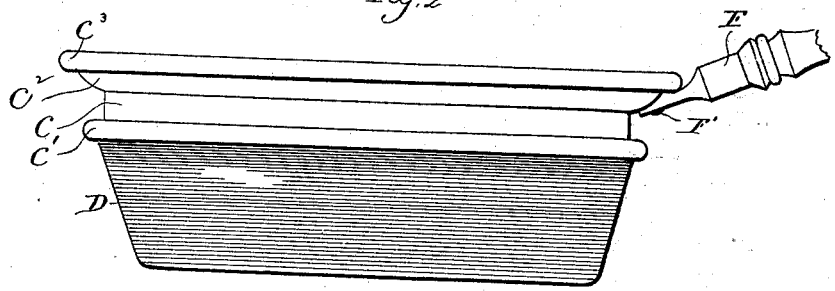

Figure 1, a view in vertical section of a chafing-dish constructed in accordance with my invention; Fig. 2, a detached view, in side elevation, of the enameled food-pan, together with its metal carrying-ring and its handle.

Heretofore that class of cooking utensils known as "chafing-dishes" have almost invariably had their food-pans made of sheet metal, which is likely to corrode and which is difficult to keep clean, even when great care is bestowed upon it. The food-pans of chafing-dishes have also been made of enameled sheet metal, but when so made have been adapted in depth to extend above the edge of the water-pan to a sufficient extent to permit the application of the handle and the reception of the cover.

Chafing-dishes constructed as last described have been objectionable on account of the difficulty of applying handles to the enameled portions of their food-pans, on account of the danger of chipping the enamel in the exposed upper edges of the pans, and on account of the unsightly appearance caused by the exposure of the enameled upper edges of the pans.

The object of my present invention is to avoid the objections above mentioned and to produce a simple and strong chafing-dish having all the advantages of an enameled food-pan, so far as cleanliness and wholesomeness are concerned, and constructed with particular reference to durability and attractive appearance.

With these ends in view my invention consists in a chafing-dish or other cooking utensil having certain details of construction, as will be hereinafter described, and pointed out in the claims.

In carrying out my invention as herein shown I employ a sheet-metal food-pan A, having its inner and outer surfaces completely enveloped by a coating of enamel B and having its upper edge turned outwardly for the formation of an annular supporting-flange $A'$. With such an enameled food-pan I employ a sheet-metal carrying-ring C, which is not enameled, but which is by preference finished in correspondence with the finish of the water-pan D and the cover E of the chafing-dish. Here I may point out that the food-pan is considerably shallower than the water-pan and sits down within the upper edge thereof, so as to be concealed from view except when the cover is removed and the utensil is viewed from the top. The said carrying-ring, however, extends upward considerably above the edge of the water-pan and may be viewed in one way as a part of the food-pan, of which it forms an upward extension. It is not designed that the food in the food-pan shall rise above the upper edge thereof and come in contact with the metal of the carrying-ring, though it may sometimes do so; but the carrying-ring will of course perform the function of preventing the food in the pan from escaping therefrom when being stirred actively or when boiling. The lower edge of the carrying-ring is formed with a horizontally-arranged outwardly-extending annular carrying-flange $C'$, the extreme edge of which is turned downward and inward, as by spinning, so as to firmly clasp the supporting-flange $A'$ of the food-fan. As thus formed the carrying-flange rests upon the annular shoulder $D'$ of the water-pan, whereby the food-pan is supported above the bottom thereof, with a space $D^2$ between them for the water. The upper edge of the carrying-ring is formed with a flaring cover-flange $C^2$, the outer edge of which is turned downward and inward, as at $C^3$, to form a bead-like finish. This cover-flange receives the cover E and also provides for the direct attachment to it in a rigid manner of the handle F by means of rivets $F'$ or equivalent devices.

It will be seen that in my improved construction I employ an interiorly and exteriorly enameled food-pan which is beyond cavil, altogether easier to keep clean, and more wholesome than any metal pan which exposes a metal surface can possibly be. The upper edge of the enameled food-pan is not, however, exposed to view, so that the completed chafing-dish presents the appearance of being exclusively made of metal. A further advantage is that the enamel is protected against being chipped by the constant removal and restoration of the cover, which does not come in contact with the enamel at all under my construction. A still further advantage is that the handle may be as rigidly secured in place as in any metal chafing-dish, for the reason that it is secured to the carrying-ring instead of to the enameled pan.

Although I have shown and described my invention as applied to the production of chafing-dishes, it is apparent that it may be utilized in the production of other cooking utensils having the same general characteristics as chafing-dishes. I would therefore have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

1. In a chafing-dish or like cooking utensil, the combination with a water-pan, of an enameled food-pan, a carrying-ring formed independently of the said food-pan, having its lower portion secured to the upper portion thereof, and extending upward above the food-pan of which it forms an upward extension, a cover adapted to fit the upper portion of the said carrying-ring, and a handle applied to the said ring.

2. In a chafing-dish or allied cooking utensil, the combination with an enameled food-pan formed at its upper edge with an outwardly-extending annular supporting-flange, of a carrying-ring formed upon its lower edge with an annular carrying-flange which is clasped over the supporting-flange of the food-pan, and the upper edge of the said ring being formed with a cover-flange for the reception of a cover, and a handle rigidly secured to the said carrying-ring.

In testimony whereof I have signed this specification in the presence of two subscribing witnesses.

GEO. E. SAVAGE.

Witnesses:
E. J. POOLEY,
W. L. MIRRIELEES.